US 8,241,923 B2

(12) United States Patent
Morii

(10) Patent No.: US 8,241,923 B2
(45) Date of Patent: Aug. 14, 2012

(54) METHOD FOR CORRECTING MASK PATTERN AND METHOD FOR MANUFACTURING ACCELERATION SENSOR AND ANGULAR VELOCITY SENSOR BY USING THE METHOD FOR CORRECTING THE MASK PATTERN

(75) Inventor: Akio Morii, Souka (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 157 days.

(21) Appl. No.: 12/522,786

(22) PCT Filed: Oct. 30, 2008

(86) PCT No.: PCT/JP2008/069764
§ 371 (c)(1),
(2), (4) Date: Jul. 10, 2009

(87) PCT Pub. No.: WO2009/060781
PCT Pub. Date: May 14, 2009

(65) Prior Publication Data
US 2009/0305439 A1      Dec. 10, 2009

(30) Foreign Application Priority Data
Nov. 7, 2007    (JP) .................................. 2007-289623

(51) Int. Cl.
*H01L 21/00*    (2006.01)
(52) U.S. Cl. ..................... 438/8; 257/414; 257/E21.231
(58) Field of Classification Search .................. 438/8, 7, 438/9, 14, 734, 48–55; 257/E21.214, 414–419, 257/E21.231, E21.23, E21.521, E21.524, 257/E21.529–E21.533, E29.324, E21.645–E21.694; 216/59–81
See application file for complete search history.

(56) References Cited

U.S. PATENT DOCUMENTS

| 6,772,632 B2 | 8/2004 | Okada |
| 2004/0261529 A1 | 12/2004 | Yoshida et al. |

FOREIGN PATENT DOCUMENTS

| EP | 1491901 A1 | 12/2004 |
| JP | 06-053170 A1 | 2/1994 |
| JP | 07-152147 A1 | 6/1995 |
| JP | 2003-329702 A1 | 11/2003 |
| JP | 2004-144598 A1 | 5/2004 |
| JP | 2005-017080 A1 | 1/2005 |
| WO | 2004/028952 A2 | 4/2004 |

OTHER PUBLICATIONS

Extended European Search Report, European Patent Application No. 08847989.4, dated Apr. 5, 2012 (8 pages).

*Primary Examiner* — Julio J Maldonado
*Assistant Examiner* — Sonya McCall Shepard
(74) *Attorney, Agent, or Firm* — Burr & Brown

(57) ABSTRACT

A method for correcting a mask pattern used for dry-etching an object with higher accuracy, and for manufacturing an acceleration sensor and an angular velocity sensor. The object is first etched by a dry-etching process using an uncorrected reference mask pattern. Then, distribution of the size of expansion of a tapered portion formed in a surface of the object is measured. Thereafter, the measured distribution is approximated by using a quadratic curve ($Y=AX^2+B$) so as to determine A and B. Consequently, an amount t of correction for the tapered portion, which is expressed by the following equation (1) and related to a width of an opening of the mask pattern in a position at a distance r from a center of the object to be etched, can be set. In this way, the correction for the tapered portion can be carried out.

$$t=(Ar^2+B)/2 \qquad (1)$$

3 Claims, 15 Drawing Sheets

METHOD FOR CORRECTING MASK PATTERN AND METHOD FOR MANUFACTURING ACCELERATION SENSOR AND ANGULAR VELOCITY SENSOR BY USING THE METHOD FOR CORRECTING THE MASK PATTERN

BACKGROUND OF THE INVENTION

1. Field of the Invention

The present invention relates to a method for correcting a mask pattern used for dry-etching a silicon wafer or the like, and also relates to a method for manufacturing an acceleration sensor and/or angular velocity sensor by using the method for correcting the mask pattern.

2. Background Art

In recent years, development of a small-sized sensor utilizing the so-called MEMS (Micro Electromechanical Systems) technology has been advanced, wherein application of a sensor for detecting acceleration and/or angular velocity to various devices or machines, such as portable phones and/or game machines, has been studied. Generally, the acceleration sensor and/or angular velocity sensor of this type is manufactured by using an SOI wafer having a three-layer structure composed of a silicon layer, a silicon-oxide layer and another silicon layer. More specifically, the sensor of this type includes a frame having an opening (or through hole) provided to extend through the SOI wafer, and a weight supported by the frame via a plurality of beams and provided to be displaced when applied with external force. Namely, when the external force (i.e., the acceleration or angular velocity) is applied to the weight, this sensor serves to measure such acceleration or angular velocity by detecting displacement of the weight (Patent Documents 1 and 2).

For instance, the sensor for measuring the acceleration by detecting the displacement includes a piezo-resistance-type sensor, which has piezo-resistance elements respectively provided to the beams and is adapted for detecting change of resistance caused by bending of each beam, and a capacitance-type sensor adapted for detecting change of capacitance associated with the displacement of the weight.

While the sensor for measuring the angular velocity by detecting the displacement has substantially the same configuration as the capacitance-type one, the weight of this sensor is grounded and designed to be moved in a simple harmonic manner when an alternating current is applied to an associated counter electrode. Thus, this sensor is configured to detect the Coriolis force from the change of capacitance caused by the application of the external force to the sensor.

Patent Document 1: JP2003-329702A
Patent Document 2: JP2004-144598A

The conventional MEMS-type sensor as described above is provided to the SOI wafer in a multiple pattern. In this case, in a step of forming each weight, a dry-etching process, such as DRIE (Deep Reactive Ion Etching) or the like, is employed for etching the silicon layer by using a reactive gas excited by plasma.

However, in a usual dry-etching process provided to the silicon wafer, the plasma may tend to be non-uniform in the surface of the silicon wafer, resulting in some in-plane distribution of the plasma changing from the center of the silicon wafer toward the periphery thereof. Thus, an unwanted tapered and/or tilted portion is formed in each necessary hole or opening formed by the etching. This leads to deterioration of accuracy of the etching.

Similarly, such a tapered and/or tilted portion is also formed upon the formation of each weight by the dry-etching process provided to the SOI wafer. Namely, in each tapered portion of the etched silicon wafer, the width of a deeper portion of the hole or opening formed by the etching (i.e., a region from which the silicon-oxide layer of the SOI wafer is exposed) tends to be greater than the width of the opening in the surface of the wafer at which the etching process is started. Accordingly, such a tapered portion should make it difficult to form each weight as designed in advance. For instance, if an etching speed of an etching apparatus used for the etching process is increased as one goes toward a central portion of the SOI wafer, the degree or size of the tapered portion will be greater toward the central portion of the wafer.

Meanwhile, the formation of the tilted portions can be attributed to the fact that the direction in which the reactive gas penetrates into the silicon layer is not always vertical to the surface of the SOI wafer. Namely, the center of the deeper portion of each formed opening (i.e., the region from which the silicon-oxide layer of the SOI wafer is exposed) tends to be shifted toward the periphery of the wafer, relative to the center of the opening in the surface at which the etching process is started. Such a tilted portion should shift the center of gravity of each weight from a designed position (desired position) thereof, leading to deterioration of operational properties of the sensor. The degree or size of such a tilted portion will be increased as one goes toward the periphery of the SOI wafer.

It is true that the degree or size of such tapered and tilted portions depends on the apparatus used for the etching process, conditions of the process, thickness of the silicon wafer and/or SOI wafer, and the like. However, it is quite difficult to successfully prevent the formation of the tapered and tilted portions, by only controlling the apparatus and/or process conditions.

SUMMARY OF THE INVENTION

The present invention was made in light of the above circumstances, and therefore it is an object of this invention to provide a new method for correcting the mask pattern used for dry-etching an object, such as the silicon wafer or the like, with higher accuracy. Another object of this invention is to provide a new method for readily manufacturing the acceleration sensor and/or angular velocity sensor, each having a significantly small size and excellent reliability.

The present invention is a method for correcting a mask pattern having an opening used for dry-etching, wherein the method is designed for correcting a width of the opening of the mask pattern, and wherein the method comprises: etching an object to be etched, by dry-etching, with a desired etching apparatus using a reference mask pattern which is not yet corrected, and then measuring distribution of the size of expansion of a tapered portion formed in a surface of the object to be etched; and approximating the measured distribution by using a quadratic curve ($Y=AX^2+B$), so as to determine A and B, and then setting an amount t of correction for the tapered portion, expressed by the following equation (1) and related to the width of the opening of the mask pattern in a position at a distance r from a center of the object to be etched, thereby performing the correction for the tapered portion, such that the width of the opening can be set narrower than a designed value (desired value) thereof.

$$t=(Ar^2+B)/2 \qquad (1)$$

The method for correcting the mask pattern according to this invention further comprises: measuring distribution of the size of a tilted portion formed in the surface of the object to be etched; and (A) approximating the measured distribution by using a straight line (Y=kX), so as to determine k (k>0), and then setting an amount $C_x$ of correction in the X-axial direction and an amount $C_y$ of correction in the Y-axial direction, respectively expressed by the following equations (2-1) and (2-2) and related to the width of the opening of the mask pattern in a position corresponding to a position vector r having coordinates (x, y) relative to the center of the object to be etched, thereby performing the correction for the tilted portion, based on the amounts $C_x$ and $C_y$ of correction:

$$C_x = kx \tag{2-1}$$

$$C_y = ky \tag{2-2}$$, or (B) approximating the measured distribution by using a quadratic curve (Y=$k_1 X^2 + k_2 X$), so as to determine $k_1$, $k_2$ ($k_1$>0, $k_2$>0), and then setting the amount $C_x$ of correction in the X-axial direction and the amount $C_y$ of correction in the Y-axial direction, respectively expressed by the following equations (3-1) and (3-2) and related to the width of the opening of the mask pattern in the position corresponding to the position vector r having coordinates (x, y) relative to the center of the object to be etched, thereby performing the correction for the tilted portion, based on the amounts $C_x$ and $C_y$ of correction.

$$C_x = k_1(x^2+y^2)^{1/2} \cdot x + k_2 \cdot x \tag{3-1}$$

$$C_y = k_1(x^2+y^2)^{1/2} \cdot y + k_2 \cdot y \tag{3-2}$$

Alternatively, the present invention is a method for manufacturing an acceleration sensor or an angular velocity sensor, comprising: dividing an SOI wafer having a three-layer structure composed of a silicon layer (or active-layer silicon), a silicon-oxide layer and another silicon layer (or base silicon), into multiple faces, and then providing a frame, a plurality of beams respectively projecting inward from the frame and a weight junction supported by the beams, to the silicon layer (or active-layer silicon), for each divided face of the SOI wafer; forming another frame and a weight to the silicon layer (or base silicon), the weight being positioned inside the frame, in a non-contact manner to the frame, and joined to and held by the weight junction via the silicon-oxide layer; then removing the silicon-oxide layer exposed to the outside; and joining a supporting substrate to the frame of the silicon layer (or base silicon), in a non-contact manner to the weight, wherein, in forming the frame and weight to the silicon layer (or base silicon), the frame and weight are formed, respectively, by forming an opening, by dry-etching the silicon layer (or base silicon), via a mask pattern having a corresponding opening, until the silicon-oxide layer is exposed, wherein the mask pattern has been corrected, in advance, to have a desired width of the opening thereof, and wherein the correction of the mask pattern comprises: etching an object to be etched, by dry-etching, with a desired etching apparatus using a reference mask pattern which is not yet corrected, and then measuring distribution of the size of expansion of a tapered portion formed in a surface of the object to be etched; and approximating the measured distribution by using a quadratic curve (Y=$AX^2+B$), so as to determine A and B, and then setting an amount t of correction for the tapered portion, expressed by the following equation (1) and related to the width of the opening of the mask pattern in a position at a distance r from a center of the object to be etched, thereby performing the correction for the tapered portion, such that the width of the opening can be set narrower than a designed value thereof.

$$t = (Ar^2 + B)/2 \tag{1}$$

The method for manufacturing the acceleration sensor and angular velocity sensor according to this invention further comprises: measuring distribution of the size of a tilted portion formed in the object to be etched; and (A) approximating the measured distribution by using a straight line (Y=kX), so as to determine k (k>0), and then setting an amount $C_x$ of correction in the X-axial direction and an amount $C_y$ of correction in the Y-axial direction, respectively expressed by the following equations (2-1) and (2-2) and related to the width of the opening of the mask pattern in a position corresponding to a position vector r having coordinates (x, y) relative to the center of the object to be etched, thereby performing the correction for the tilted portion, based on the amounts $C_x$ and $C_y$ of correction:

$$C_x = kx \tag{2-1}$$

$$C_y = ky \tag{2-2}$$, or (B) approximating the measured distribution by using a quadratic curve (Y=$k_1 X^2 + k_2 X$), so as to determine $k_1$, $k_2$ ($k_1$>0, $k_2$>0), and then setting the amount $C_x$ of correction in the X-axial direction and the amount $C_y$ of correction in the Y-axial direction, respectively expressed by the following equations (3-1) and (3-2) and related to the width of the opening of the mask pattern in the position corresponding to the position vector r having the coordinates (x, y) relative to the center of the object to be etched, thereby performing the correction for the tilted portion, based on the amounts $C_x$ and $C_y$ of correction.

$$C_x = k_1(x^2+y^2)^{1/2} \cdot x + k_2 \cdot x \tag{3-1}$$

$$C_y = k_1(x^2+y^2)^{1/2} \cdot y + k_2 \cdot y \tag{3-2}$$

In the method for manufacturing the acceleration sensor and angular velocity sensor according to this invention, the correction for the tilted portion, related to the width of the opening of the mask pattern, is performed, by setting an amount of correction for the tilted portion to be expressed by $C_x$ and $C_y$, in regions having influence on the length of the corresponding beam, while setting the amount of correction for the tilted portion to be expressed by $C_x/2$ and $C_y/2$ in the other regions.

As described above, the method according to the present invention is intended to control the formation of the tapered portion and tilted portion, not by controlling the apparatus and/or conditions employed or selected for the dry-etching process, but by correcting the opening of the mask pattern used for the dry-etching process, based on the distribution of the tapered portion and tilted portion, respectively detected in the surface of the wafer and peculiar to such apparatus and conditions. With this method, the dry-etching process can be provided to the silicon wafer with higher accuracy, thus achieving significantly accurate position control for the length of each beam as well as for the center of gravity of the weight. Additionally or alternatively, this invention is intended for providing the method for manufacturing the acceleration sensor and/or angular velocity sensor having a significantly small size and higher reliability.

BRIEF DESCRIPTION OF THE DRAWINGS

FIGS. 11(A) to 11(C) are views, each illustrating correction for the tapered portion, related to an opening of a mask pattern, wherein FIG. 11(A) shows an SOI wafer, FIG. 11(B) shows the mask pattern located at a point $P_0$ at a center of the SOI wafer, and FIG. 11(C) shows the mask pattern located at a point P at a distance r from the center.

FIGS. 17(A) to 17(C) are views, each illustrating the correction for the tapered portion, related to the opening of the mask pattern, wherein FIG. 17(A) shows the SOI wafer, FIG. 17(B) shows the mask pattern located at the point $P_0$ at the center of the SOI wafer, and FIG. 17(C) shows the mask pattern located at the point P at the distance r from the center.

DETAILED DESCRIPTION OF THE INVENTION

Hereinafter, one exemplary embodiment of the present invention will be described, with reference to the drawings.

Figure 1:
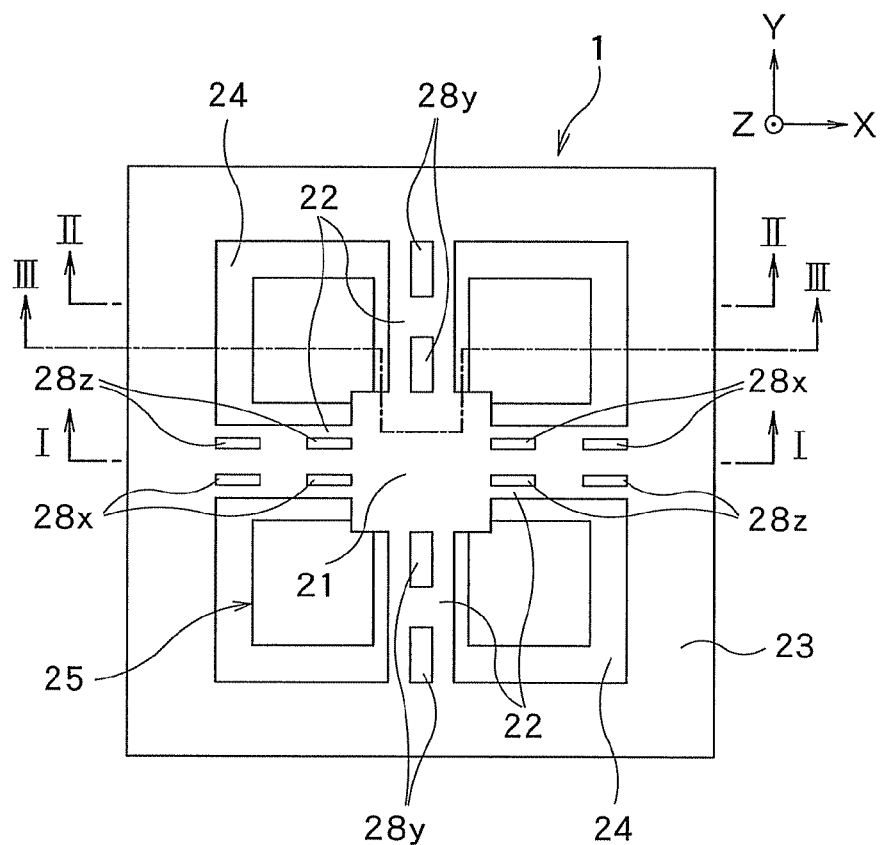
FIG. 1 is a plan view of a piezo-resistance-type acceleration sensor, which is one example of sensors manufactured by a method according to the present invention.
Figure 2:
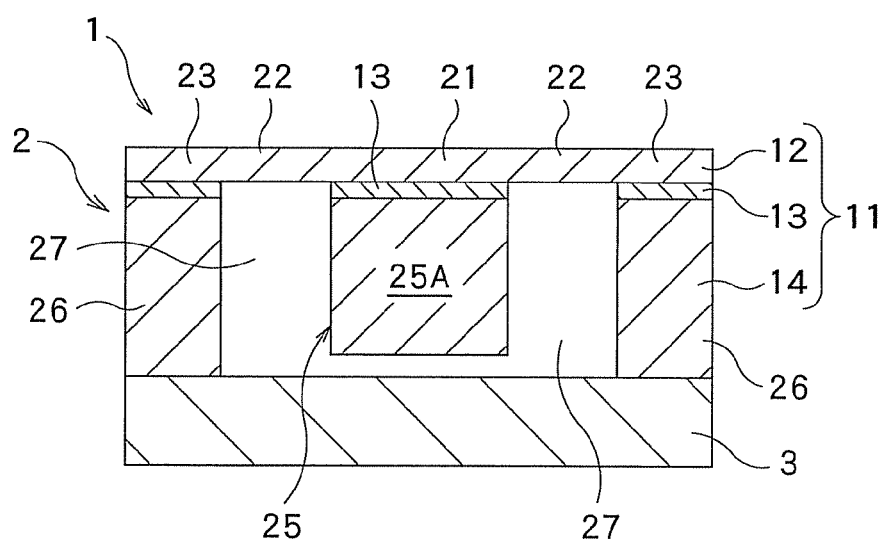
FIG. 2 is a cross sectional view, taken along line I-I, of the sensor shown in FIG. 1.
Figure 3:
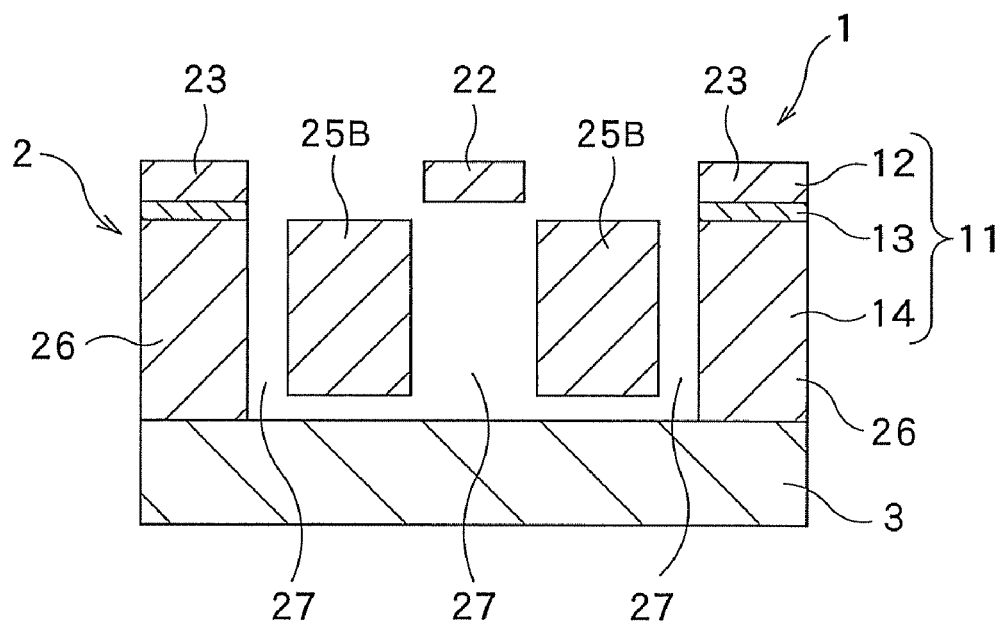
FIG. 3 is a cross sectional view, taken along line II-II, of the sensor shown in FIG. 1.
Figure 4:
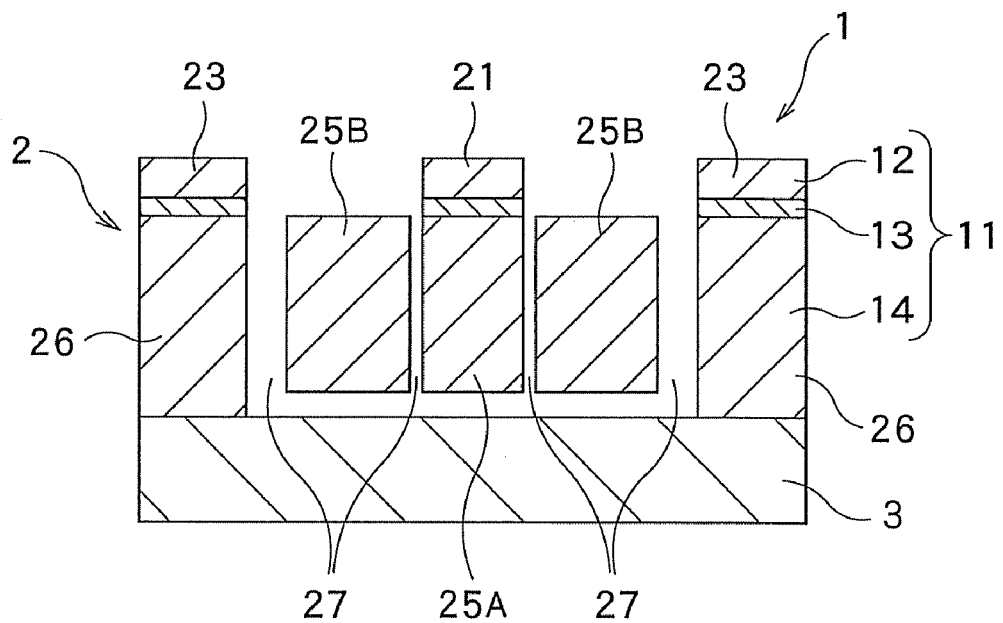
FIG. 4 is a cross section, taken along line III-III, of the sensor shown in FIG. 1.
Figure 5:
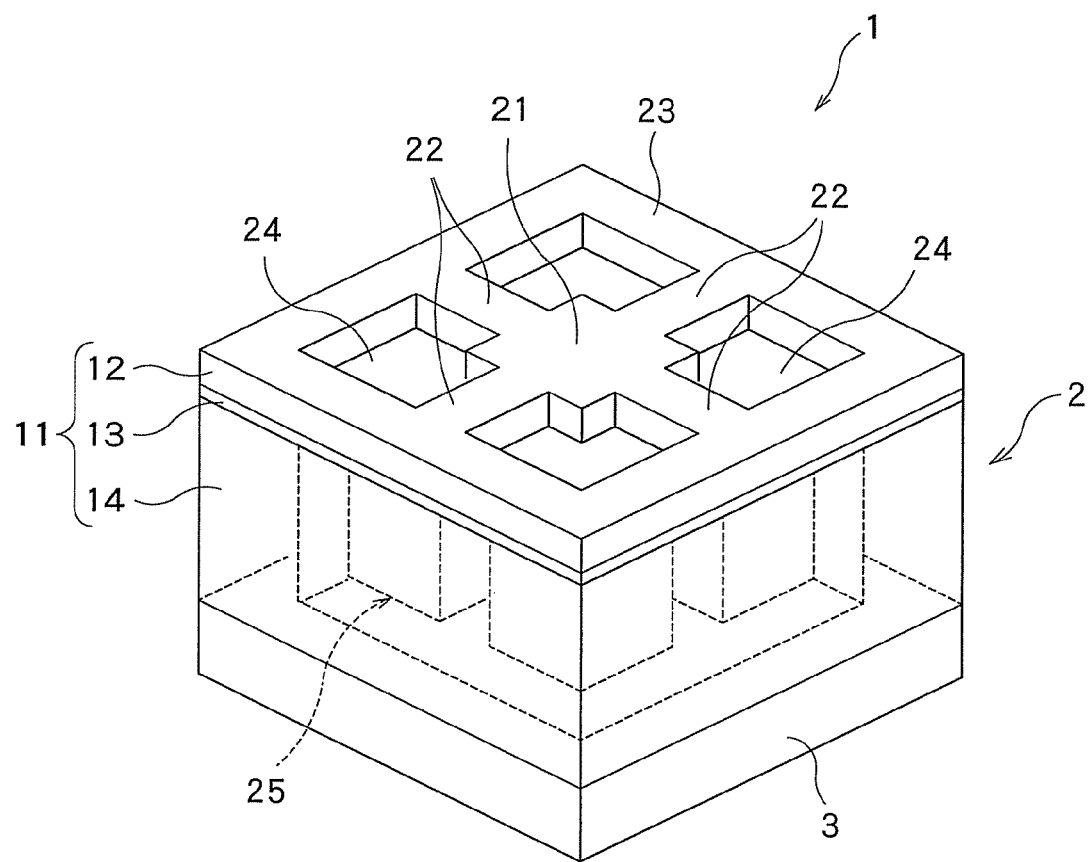
FIG. 5 is a perspective view of the sensor shown in FIG. 1.
Figure 6:
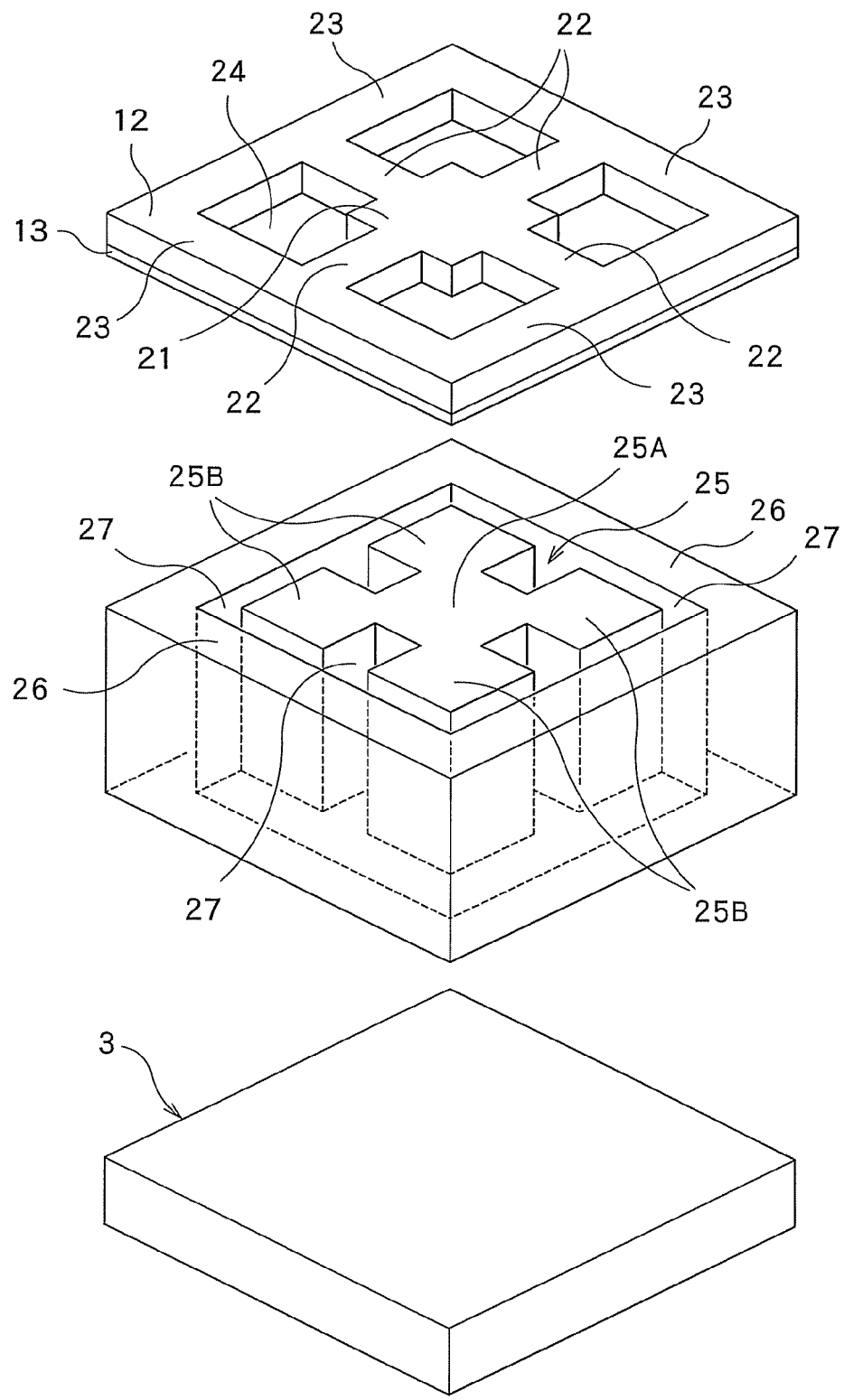
FIG. 6 is another perspective view of the sensor shown in FIG. 1, in which a silicon-oxide layer is separated from a silicon layer (or base silicon), while a supporting substrate is separated from the silicon layer (or base silicon).

FIG. 1 is a plan view of a piezo-resistance-type acceleration sensor, which is one example of sensors manufactured by a method according to the present invention, FIG. 2 is a cross section, taken along line I-I, of the sensor shown in FIG. 1, FIG. 3 is a cross sectional view, taken along line II-II, of the sensor shown in FIG. 1, and FIG. 4 is a cross sectional view, taken along line III-III, of the sensor shown in FIG. 1. In these drawings, the sensor 1 includes a sensor body 2 and a supporting substrate 3 joined to the sensor body 2. The sensor body 2 is formed of an SOI (Silicon On Insulator) substrate 11 having a three-layer structure including a silicon-oxide layer 13 interposed between a silicon layer 12 (or active-layer silicon) and another silicon layer 14 (or base silicon). FIG. 5 is a perspective view of the sensor 1 shown in FIG. 1, and FIG. 6 is another perspective view of the sensor 1 shown in FIG. 1, in which the silicon-oxide layer 13 is separated from the silicon layer 14 (or base silicon), while the supporting substrate 3 is separated from the silicon layer 14 (or base silicon).

As shown in FIGS. 1 through 6, the silicon layer 12 (or active-layer silicon), i.e., one component of the sensor body 2, includes a weight junction 21, four beams 22 respectively supporting the weight junction 21, a frame 23, and four windows 24 respectively surrounded by the beams 22 and frame 23. The four beams 22 are provided with piezo-resistance elements 28, respectively. More specifically, four piezo-resistance elements 28x, each adapted for detecting external force applied in an X-axial direction, four piezo-resistance elements 28y, each adapted for detecting the external force applied in a Y-axial direction, and four piezo-resistance elements 28z, each adapted for detecting the external force applied in a Z-axial direction, are provided to the four beams 22, respectively.

The silicon layer 14 (or base silicon), which is another component of the sensor body 2, includes a weight 25 and a frame 26 located around the weight 25 via an opening 27. The weight 25 has a thickness less than the thickness of the frame 26, and includes a base portion 25A and four projections 25B, each projecting from the base portion 25A toward a space between the crossing beams 22. The base portion 25A of the weight 25 is joined to the weight junction 21 of the silicon layer 12 (or active-layer silicon) via the silicon-oxide layer 13.

In the sensor 1 as described above, when some external force is applied, in the X-axial, Y-axial or Z-axial direction, to the weight 25 supported by the four beams 22, the weight 25 will be displaced in the same direction. With such displacement, each beam 22 will be bent. Consequently, the external force applied to the weight 25 can be detected by the respective piezo-elements 28.

Figure 7:
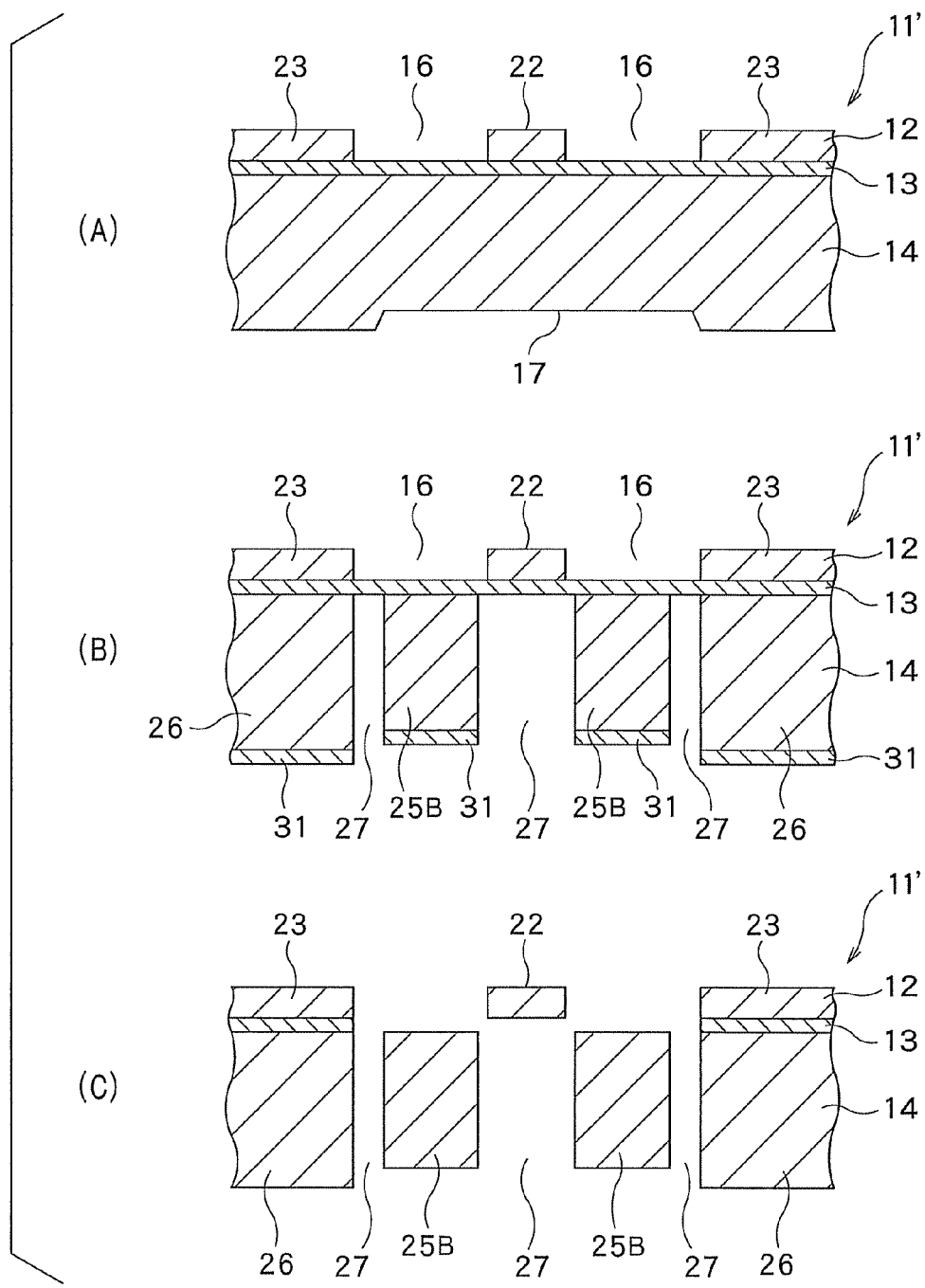
FIGS. 7(A) through 7(C) are views, respectively showing one exemplary procedure of the method for manufacturing the sensor related to the present invention.

FIGS. 7(A)-7(C) are views showing one exemplary procedure of the method according to the present invention, in which the sensor body 2 of the sensor 1 is manufactured. It is noted that FIGS. 7(A)-7(C) illustrate parts corresponding to the cross section shown in FIG. 3.

In FIGS. 7(A)-7(C), a necessary multi-faced process is performed on an SOI wafer 11' having the three-layer structure composed of the silicon layer 12 (or active-layer silicon), silicon-oxide layer 13 and silicon layer 14 (or base silicon). First, for each face of the SOI wafer 11', grooves 16 are formed in the silicon layer 12 (or active-layer silicon) in order to form the weight junction 21, beams 22 and frame 23, while a recess 17 is formed in the silicon layer 14 (or base silicon) in order to provide a desired thickness of the weight 25 (see FIG. 7(A)). The formation of the grooves 16 and recess 17 can be performed, for example, by the so-called DRIE (Deep Reactive Ion Etching) method, i.e., a dry-etching method utilizing plasma, via a mask pattern. Alternatively, the grooves 16 and recess 17 may be formed by a sand-blast method, a wet-etching method, a femto-second-laser method or the like.

Next, for each face of the SOI wafer 11', the opening 27 is formed by processing the silicon layer 14 (or base silicon) on the side of the recess 17 of the SOI wafer 11', via a mask pattern 31, until the silicon-oxide layer 13 is exposed. As a result, the weight 25 (or base portion 25A and projections 25B) and frame 26 can be formed, respectively (see FIG. 7(B)). Thereafter, each portion of the silicon layer 13, exposed to the opening 27 and the grooves 16, is removed (see FIG. 7(C)). In this way, the sensor body 2 can be obtained. The formation of the opening 27 can be performed, for example, by the DRIE method, via the mask pattern 31. Meanwhile, the silicon-oxide layer 13 can be removed, for example, by an appropriate dry-etching process using a proper reactive gas. It is noted that the method for forming the mask pattern 31 is not limited in particular. Any suitable method for forming such a mask pattern, such as by employing photolithography using a photosensitive resist or by forming a proper resin layer and/or metal layer on the wafer and then directly patterning the formed resin layer by utilizing laser plotting, or the like, can be used.

In this case, the method of this invention is designed for correcting the mask pattern 31, such that formation or occurrence of a tapered portion and/or tilted portion in each opening 27 can be appropriately controlled when the opening 27 is formed by the DRIE method, via the mask pattern 31, on the side of the silicon layer 14 (base silicon). Now, this method will be described more specifically.

Figure 8:
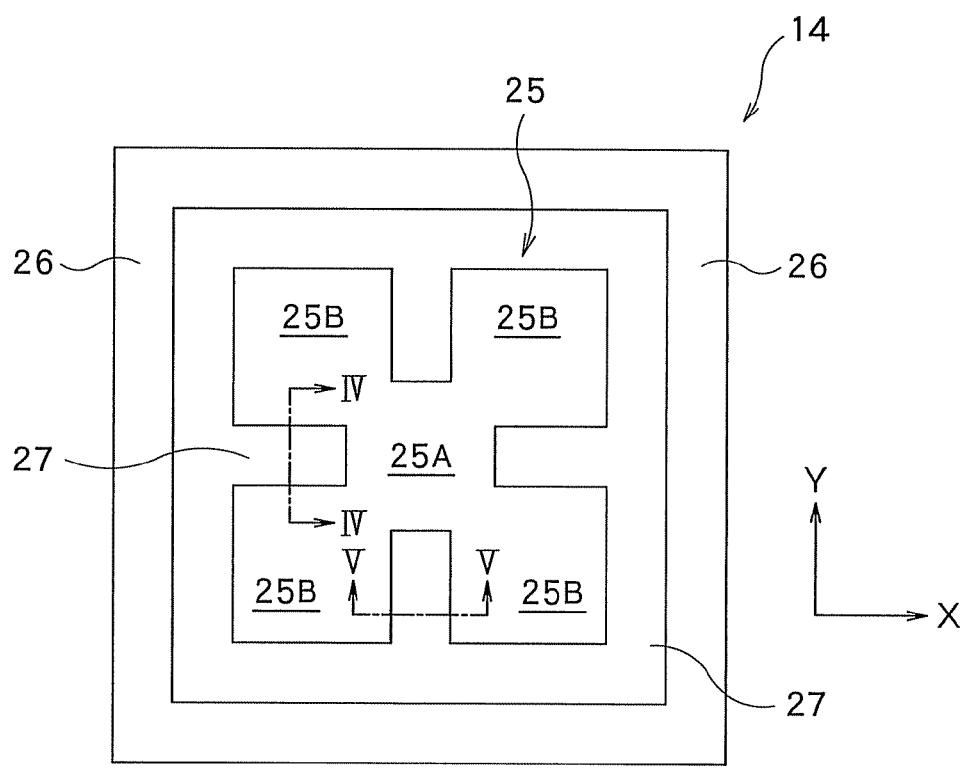
FIG. 8 is a plan view of the sensor when it is seen on the side of the silicon layer (or base silicon) having an opening (shown in FIG. 7(B)) formed therein.
Figure 9:
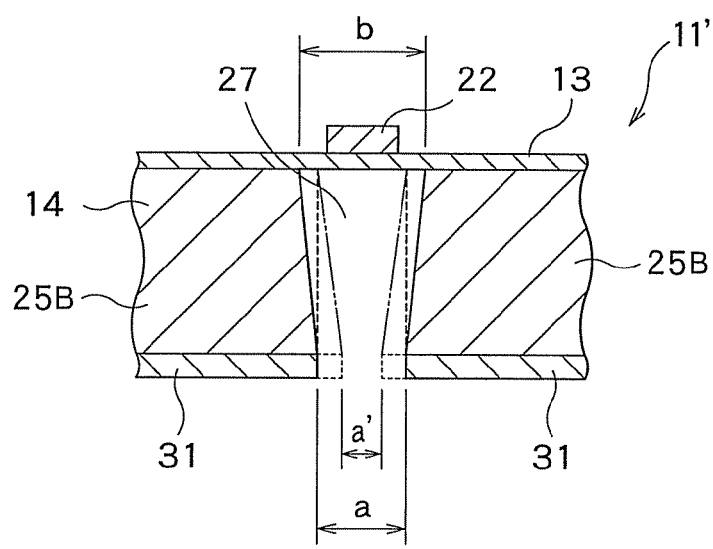
FIG. 9 is a cross sectional view taken along line IV-IV shown in FIG. 8.

First, as the method for controlling the formation of the tapered portion in each opening 27, one method for manufacturing the sensor 1 while correcting the mask pattern is described by way of example. FIG. 8 is a plan view of the sensor 1 when it is seen on the side of the silicon layer 14 (or base silicon) having the opening 27 (shown in FIG. 7(B)) formed therein, and FIG. 9 is a cross section taken along line IV-IV shown in FIG. 8. For clarity, the mask pattern 31 is not shown in FIG. 8. As shown in FIG. 9, the opening 27 formed by the DRIE method usually includes the tapered portion expanded or spread toward the silicon-oxide layer 13 (for convenience, however, the opening 27 is not tapered in FIGS. 2 through 7). Namely, a width b of a deeper portion of the opening 27 (i.e., the width of a region from which the silicon-oxide layer 13 is exposed) is usually greater than a width a of the opening in a surface at which the etching process is started (i.e., the width of a corresponding opening of the mask pattern 31). Thus, such a tapered portion makes it difficult to form the weight as designed in advance. Besides, the degree or size of the tapered portion tends to be greater as one goes toward the central portion of the SOI wafer 11', due to distribution or change of the etching speed in the surface of the SOI wafer 11'. Further, this tendency varies with an apparatus used for the etching, conditions of the etching process, and the thickness of the SOI wafer 11'.

Thus, while allowing the formation of such a tapered portion, the method of this invention is intended for controlling the tapered portion, by setting the width of the opening of the mask pattern 31 to be narrower (as depicted by a' in FIG. 9), such that the width of the deeper portion of the opening 27 (i.e., the width of the region from which the silicon-oxide layer 13 is exposed) can be changed into a designed value (i.e., the width a, as shown in FIG. 9, of the opening of the mask pattern 31).

Figure 10:
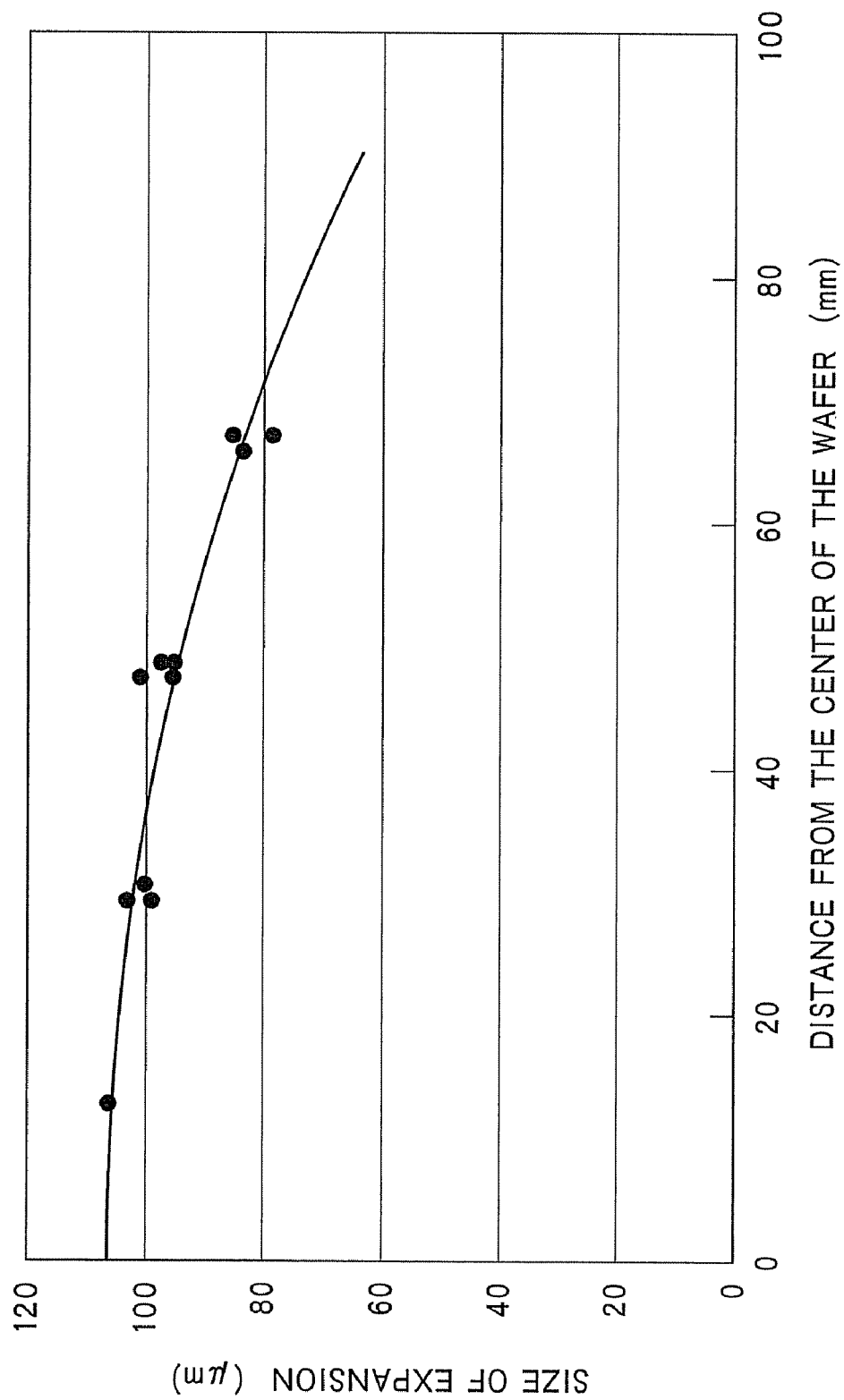
FIG. 10 is a graph showing one example of distribution of the size of expansion of a tapered portion.

In this case, the etching process is first performed, by using a predetermined apparatus under desired conditions, with the mask pattern set at the designed value thereof and hence not yet corrected for the tapered portion. Then, distribution of the size of expansion of the tapered portion formed in the SOI wafer 11' (i.e., a difference (b−a) between the width b and the width a of the opening shown in FIG. 9) is measured. FIG. 10 is a graph showing one example of the measured distribution of the size of expansion, wherein the origin is the center of the SOI wafer 11' (having a thickness of 626 μm), the X-axis expresses a distance from the center of the SOI wafer 11', and the Y-axis designates the size of expansion relative to the distance in the X-axial direction. As shown in FIG. 10, the size of expansion (i.e., b−a) of the tapered portion can be approximated by using a quadratic curve ($Y=AX^2+B$) having a peak at the center of the SOI wafer 11'. For instance, the quadratic curve shown in FIG. 10 can be expressed by $Y=-0.00532 \cdot X^2+106$. Thus, a desired amount t (see FIG. 9) of correction for narrowing the width of the opening of the mask pattern in a position at a distance r from the center of the SOI wafer 11' can be obtained by the following equation.

$$t=(b-a)/2=(Ar^2+B)/2, \quad (1)$$

Figure 11:
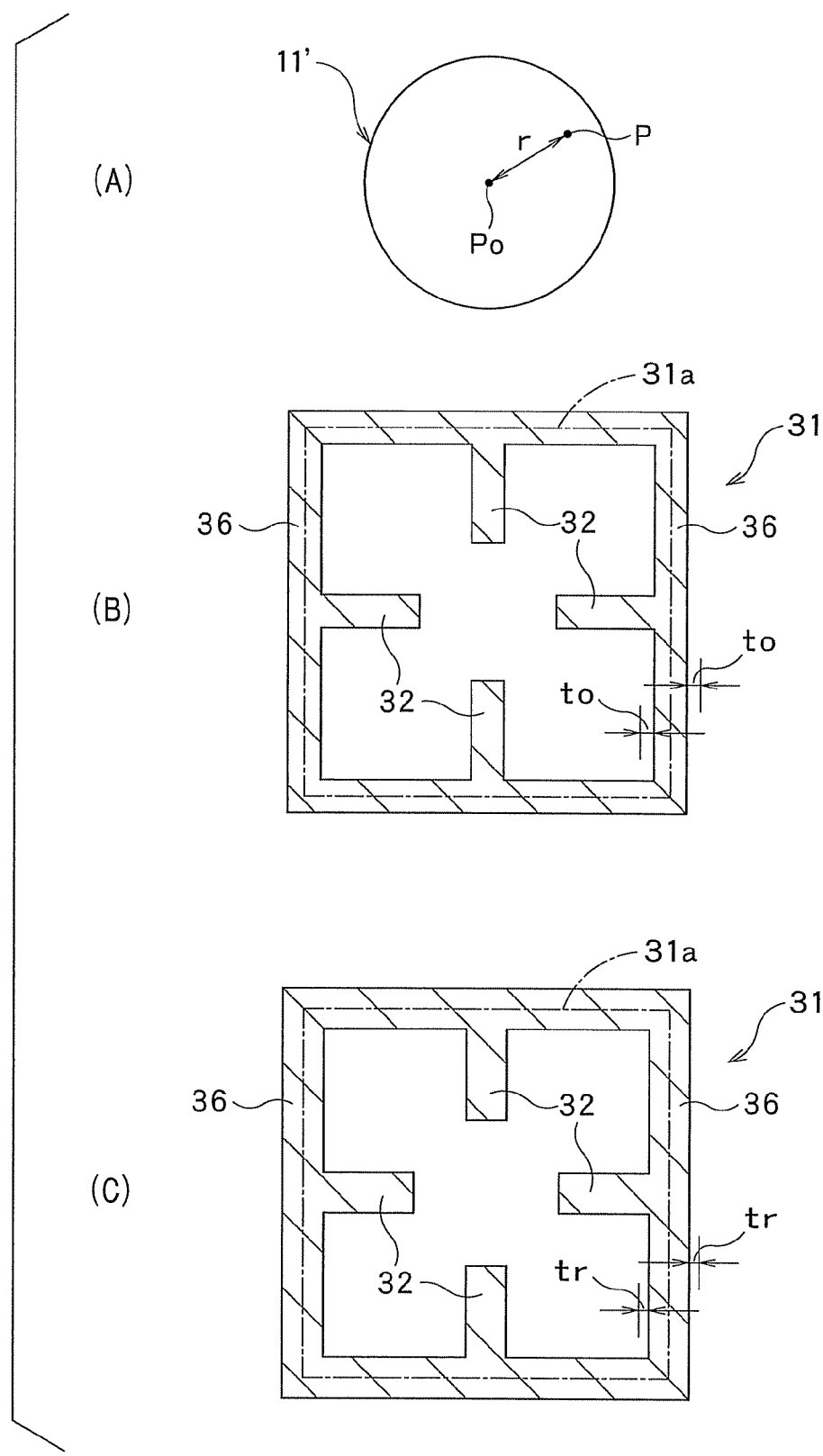

In this case, the correction amount t is set on both sides of a center line 31a (see FIGS. 11(B) and 11(C)) of the opening of the mask pattern 31.

Accordingly, with respect to the center $P_0$ of the SOI wafer 11' and a point P corresponding to the position at the distance r from the center $P_0$ of the SOI wafer 11' as shown in FIG. 11(A), the correction for the tapered portion or narrowing the width of opening of the mask pattern 31 is carried out, respectively, as shown in FIGS. 11(B) and 11(C). Namely, FIGS. 11(B) and 11(C) show a pattern of the opening (or opening pattern) of the mask pattern 31, respectively, wherein the opening pattern is designated by oblique lines. In these drawings, the mask pattern 31 includes an opening portion 36 having a corridor-like shape and four opening portions 32 projected inward from the corridor-like opening portion 36. In this case, as shown in FIG. 11(B), the correction amount ($t_0$), at the center $P_0$ of the SOI wafer 11', for the tapered portion, relative to the designed value, is expressed by $t_0=B/2$. Because the expansion of the tapered portion is the maximum at the point $P_0$, the width of the opening portions 32, 36 of the mask pattern 31 at this point $P_0$ should be set narrowest. Meanwhile, as shown in FIG. 11(C), the correction amount (t), at the point P, for the tapered portion, relative to the designed value, is expressed by $t=(Ar^2+B)/2$.

It is noted that the size of expansion (b−a) of the tapered portion can be obtained, on the assumption that the value a designates the designed value of the width of the opening in the surface at which the etching process is started, while the value b designates the width of the etched deeper portion of the opening actually measured by taking a photograph thereof by using a metallurgical microscope.

Figure 12:
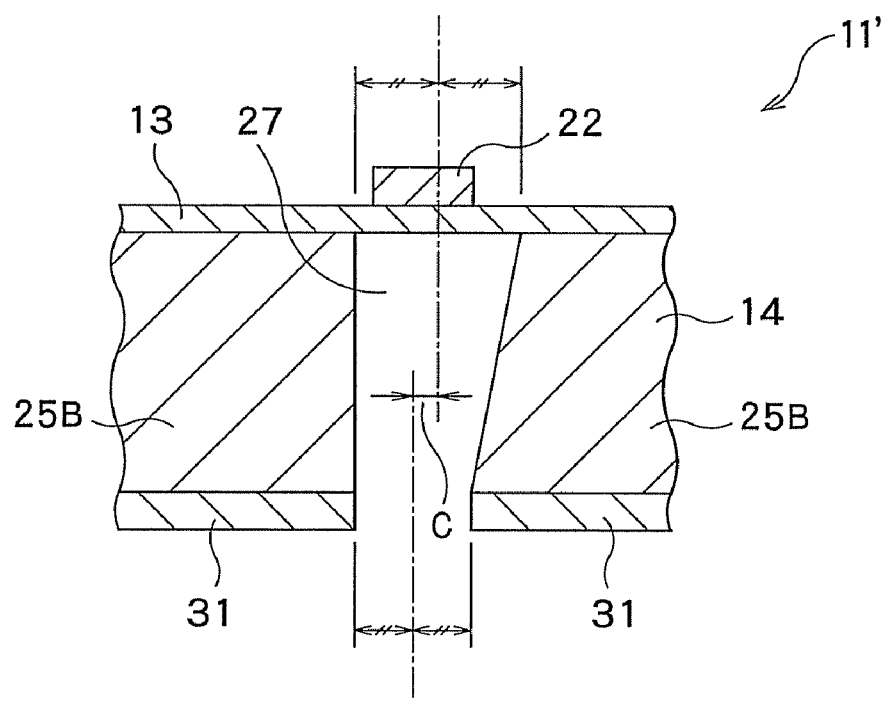
FIG. 12 is a cross sectional view taken along line V-V shown in FIG. 8.
Figure 13:
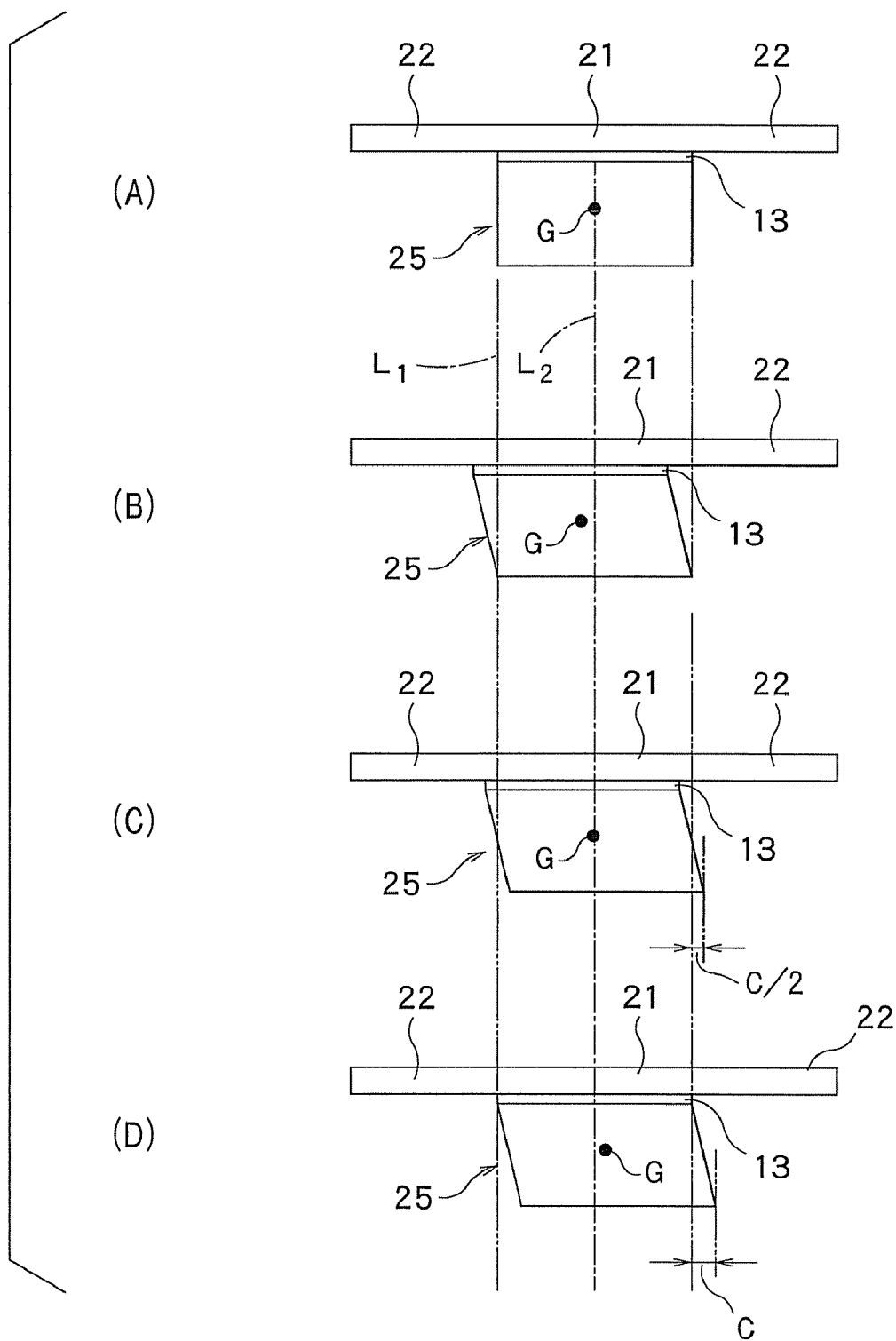
FIGS. 13(A) to 13(D) are views showing state in which tilted portions are formed, as well as illustrating correction for the tilted portions.

Next, as the method for controlling the tilted portion in each opening 27, one method for manufacturing the sensor 1 while correcting the mask pattern will be described by way of example. FIG. 12 is a cross section taken along line V-V shown in FIG. 8. Usually, as shown in FIG. 12, an unwanted tilted portion is also formed when the opening 27 is formed by the DRIE method. In such a tilted portion, the center of the deeper portion of the formed opening (i.e., the region from which the silicon-oxide layer of the SOI wafer is exposed) is shifted toward the periphery of the SOI wafer 11' relative to the center of the opening in the surface at which the etching process is started (or opening of the mask pattern 31). For convenience, however, the tilted portion is not shown in FIGS. 2 through 7. With formation of such a tilted portion, the center of gravity of the weight is substantially shifted from a designed position thereof. For instance, as shown in FIG. 13(A), if the tilted portion is not formed, the weight junction 21 can be joined to the weight 25, while the center of gravity G of the weight 25 can be positioned such that each length of the two beams 22 respectively supporting the weight junction 21 can be equally set as designed in advance (i.e., corresponding to the length defined between two dotted lines $L_1$, $L_2$). However, if the tilted portion is formed as shown in FIG. 13(B), the joined portion between the weight junction 21 and the weight 25 as well as the center of gravity G of the weight 25 are shifted from designed positions thereof (as designated by the two dotted lines $L_1$, $L_2$), respectively. Thus, the length of the two beams 22 respectively supporting the weight junction 21 should be different from each other. The degree or size c (see FIG. 12) of such a tilted portion tends to be increased as one goes toward the periphery of the SOI wafer 11'. Further, this tendency varies with the apparatus used for the etching, conditions of the etching process, the thickness of the SOI wafer 11' and the like.

Figure 14:
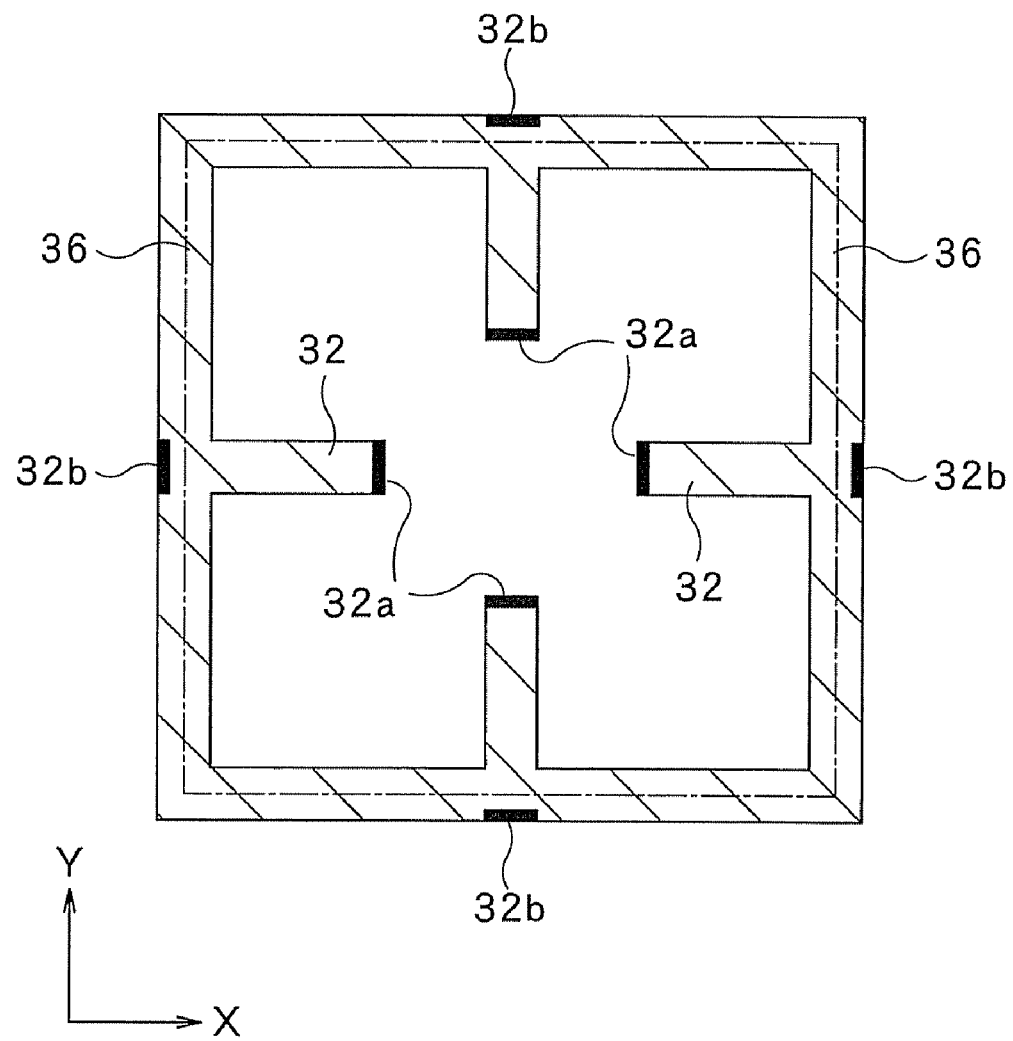
FIG. 14 is a view showing a pattern of the opening of the mask pattern.

Thus, while allowing the formation of such a tilted portion, the method of this invention is intended for controlling the tilted portion by correcting the mask pattern, in a combination of 50% correction (i.e., the correction amount=C/2) as shown in FIG. 13(C), in which the center of gravity G of the weight 25 is set in the designed position thereof (as designated by the dotted line $L_2$) while the joined portion between the weight junction 21 and the weight 25 is shifted from the designed position thereof (as designated by the dotted line $L_1$) and 100% correction (i.e., the correction amount=C) as shown in FIG. 13(D), in which the joined portion between the weight junction 21 and the weight 25 is set in the designed position thereof (as designated by the dotted line $L_1$) while the center of gravity G of the weight is shifted from the designed position thereof (as shown in the dotted line $L_2$). FIG. 14 shows the opening pattern of the mask pattern 31, wherein the opening pattern is designated by oblique lines. As described above, the mask pattern 31 includes the corridor-like opening portion 36 and four opening portions 32 projected inward from the corridor-like opening portion 36. The four opening portions 32 are respectively provided for forming the opening 27 configured for separating the four projections 25B respectively constituting the weight 25, while defining the joined portion between the base portion 25A constituting the weight 25 and the weight junction 21. Therefore, the length of each beam 22 is also determined by the opening portions 32. Thus, in order to equally set the length of the four beams 22 supporting the weight junction 21, the aforementioned 100% correction is provided to regions 32a, 32b respectively depicted by thick lines in the mask pattern 31, while the 50% correction is provided to the other regions of the mask pattern 31.

In this correction for the tilted portion, the etching process is first performed, by using a predetermined apparatus under desired conditions, with the mask pattern set at the designed value thereof and hence not yet corrected for the tilted portion. Then, distribution of the size (tilting amount) c of the tilted portion (see FIG. 12) formed in the SOI wafer 11' is measured.

Figure 15:
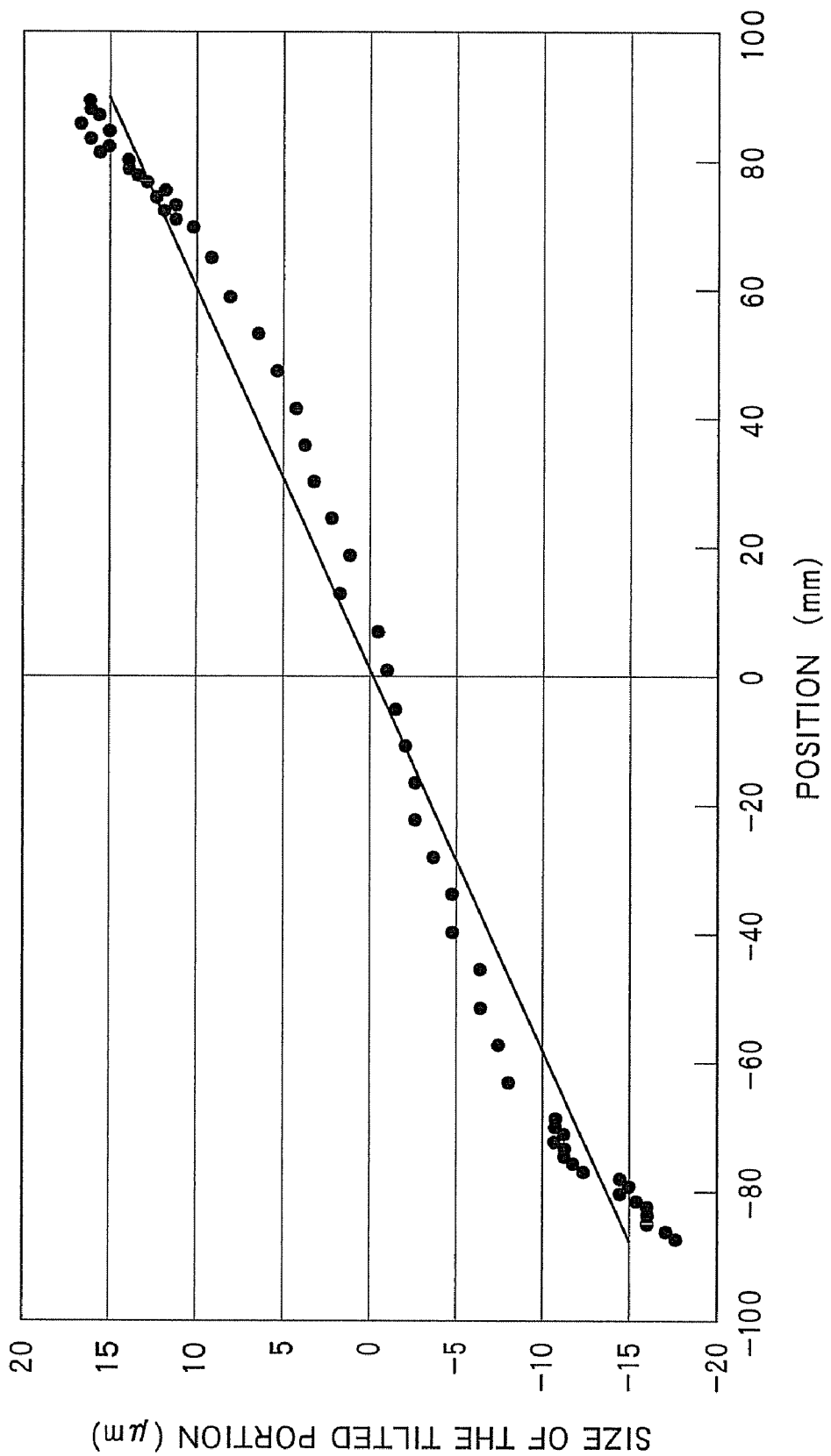
FIG. 15 is a graph showing distribution of the size of the tilted portion, as well as illustrating one exemplary approximation of the distribution by using a straight line.

FIG. 15 is a graph showing one example of the distribution of the size (tilting amount) c of the tilted portion, wherein the origin designates the center of the SOI wafer 11' (having a thickness of 626 μm), the X-axis expresses the distance from the center of the SOI wafer 11', while the Y-axis designates the distribution of the size of the tilted portion. If the distribution of the size (tilting amount) c of the tilted portion is approximated by using a straight line (Y=kX) passing through a central portion of the SOI wafer 11', as shown in FIG. 15, this line can be expressed by, for example, Y=0.17X. Accordingly, the correction amount C of the width of the opening of the mask pattern, in a position corresponding to a position vector r having coordinates (x, y) relative to the center of the SOI wafer 11', can be obtained as the following equations (2-1) and (2-2), in which the correction amount in the X-axial direction is expressed by $C_x$, while the correction amount in the Y-axial direction is expressed by $C_y$.

$$C_x = kx \quad (2\text{-}1)$$

$$C_y = ky \quad (2\text{-}2)$$

Figure 16:
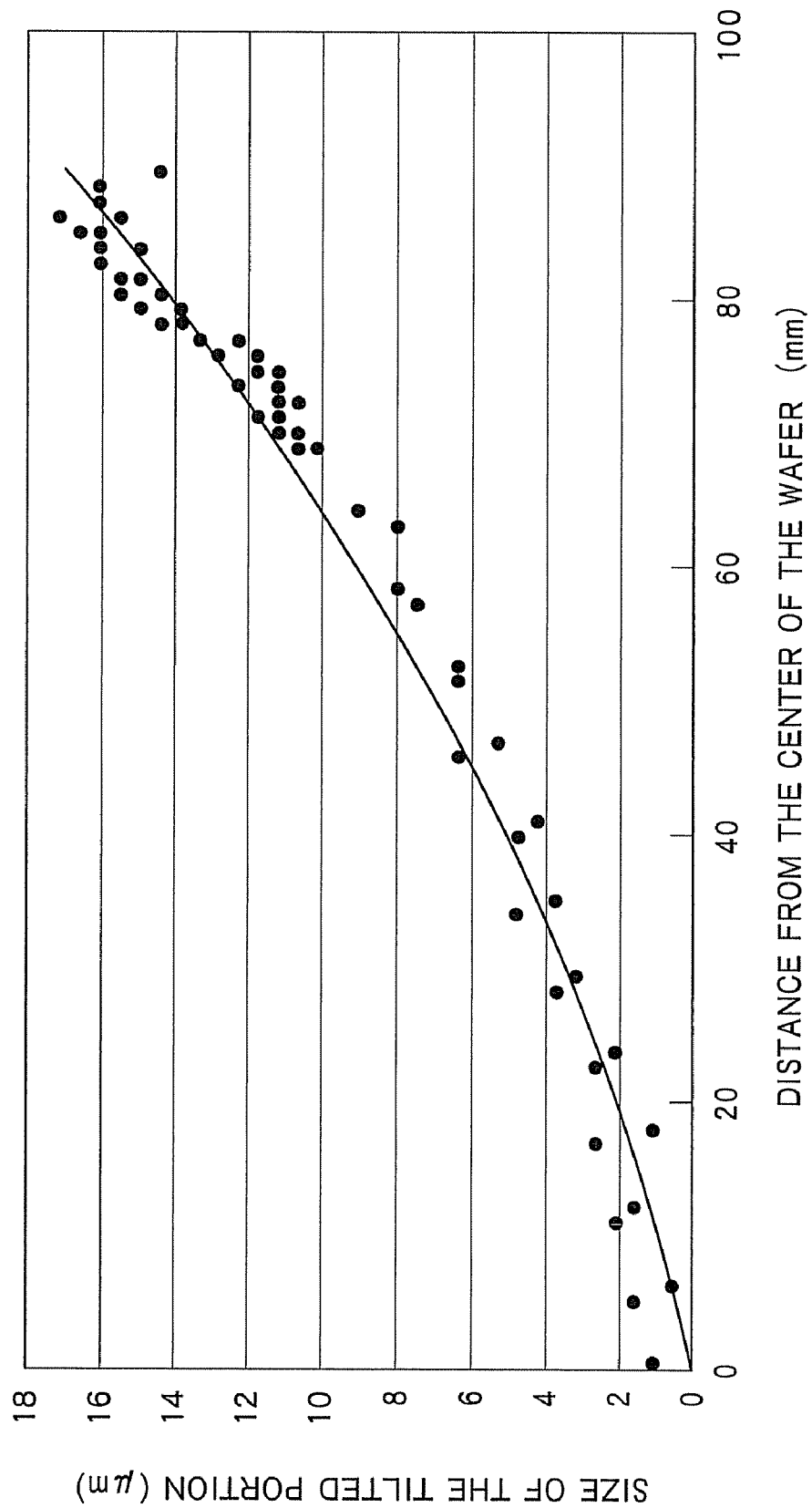
FIG. 16 is a graph showing another example of the distribution of the size of the tilted portion, as well as illustrating the approximation thereof by using a quadratic-curve.

Alternatively, if the distribution of the size c of the tilted portion is approximated by using a quadratic curve (Y=$k_1 X^2$+$k_2 X$) passing through the central portion of the SOI wafer 11', as shown in FIG. 16, this curved line can be expressed by, for example, Y=0.0012$X^2$+0.080X. In this case, the correction amount C of the width of the opening of the mask pattern, in the position corresponding to the vector r having coordinates (x, y) relative to the center of the SOI wafer 11', can be obtained as the following equations (3-1) and (3-2), in which the correction amount in the X-axial direction is expressed by $C_x$, while the correction amount in the Y-axial direction is expressed by $C_y$.

$$C_x = k_1(x^2+y^2)^{1/2} \cdot x + k_2 \cdot x \quad (3\text{-}1)$$

$$C_y = k_1(x^2+y^2)^{1/2} \cdot y + k_2 \cdot y \quad (3\text{-}2)$$

Although the distribution of the size c of the tilted portion shown in FIG. 15 might be seen as a cubic curve on the Cartesian coordinate system, it can be rather approximated by the quadratic curve as described above on the polar coordinate system.

Figure 17:
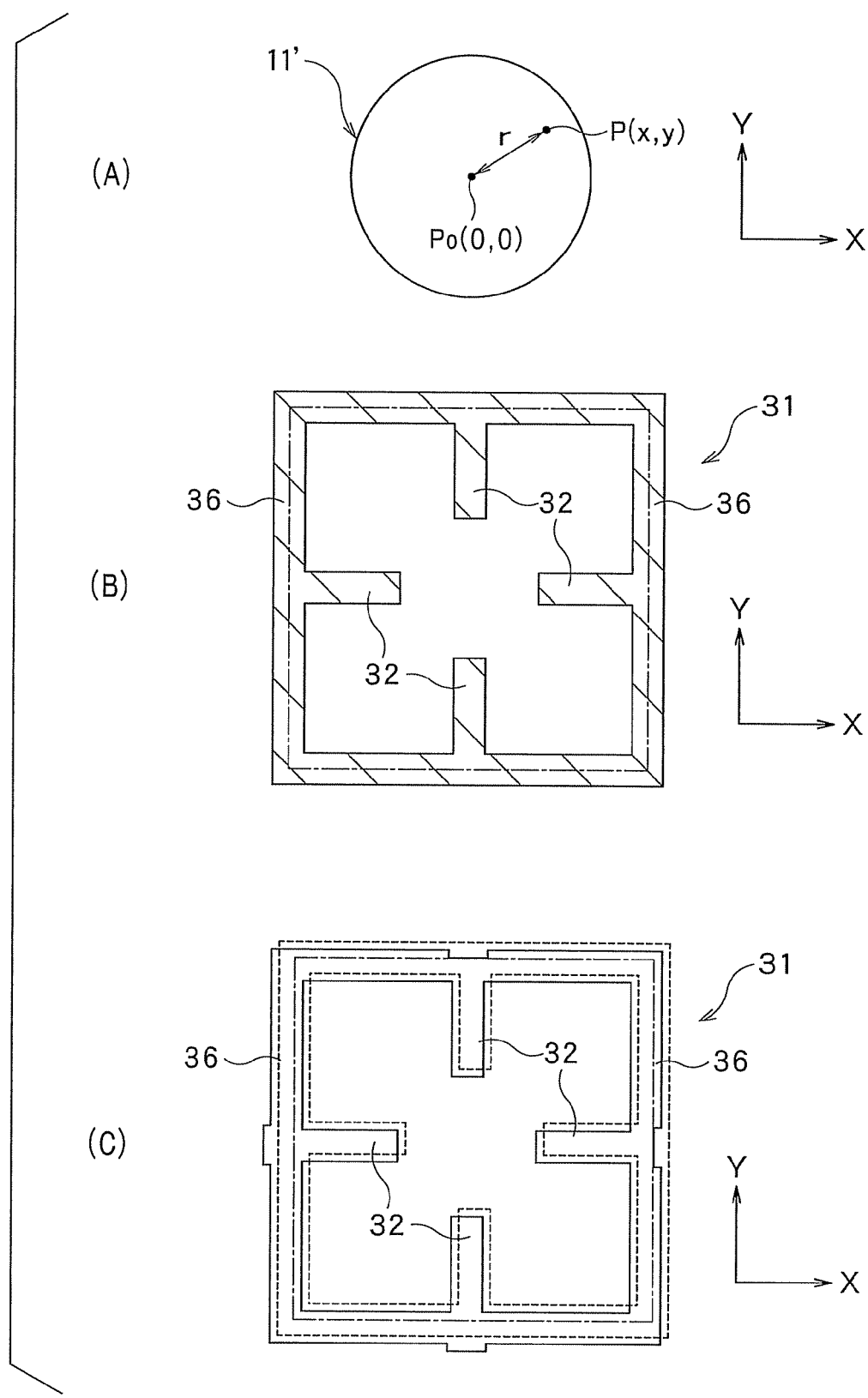

Accordingly, the correction for the tilted portion, at the center $P_0$ of the SOI wafer 11' and the point P(x, y) at the distance r from the center of the SOI wafer 11', respectively shown in FIG. 17(A), can be shown in FIGS. 17(B) and 17(C), respectively. Namely, FIGS. 17(B) and 17(C) show the opening pattern of the mask pattern 31, respectively, wherein the opening pattern is designated by oblique lines. Again, the mask pattern 31 includes the opening portion 36 having the corridor-like shape and the four opening portions 32 projected inward from the corridor-like opening portion 36. As shown in FIG. 17(B), since the tilted portion is not formed at center $P_0$ of the SOI wafer 11', the correction for the tilted portion in this position is not necessary (i.e., $C_x$=0, $C_y$=0). Thus, the opening pattern can be used as one designed in advance. Meanwhile, at the point P(x, y), the amount of correction for the tilted portion relative to the designed value (desired value) thereof is set, by using the equations (2-1) and (2-2) or equations (3-1) and (3-2). In addition, as shown in FIG. 14, the 100% correction ($C_x$, $C_y$) is performed for the regions 32a, 32b respectively depicted by thick lines in the mask pattern 31, while the 50% correction is provided to the other regions of the mask pattern 31. Thus, the openings 32, 36 of the mask pattern 31 will have shapes as shown in FIG. 17(C), respectively. It is noted that the shapes depicted by dotted lines in FIG. 17(C) designate the opening pattern corresponding to the designed value (i.e., the opening pattern at the center $P_0$), respectively.

For instance, the size c of the tilted portion can be determined by forming a hole shallower (e.g., having a 1 μm depth) and greater (in the diameter) than each opening to be formed, in advance, in an opposite surface of the wafer (i.e., a surface opposite to the surface from which the etching process is started). Then, the opening is formed by etching the wafer, with the center of this shallower hole being coincident with the center of the opening of the mask pattern. Thereafter, the amount of shift of the center of the opening formed by the etching process from the center of the shallower hole is obtained by taking an image of the deeper portion of the so-formed opening, by using the metallurgical microscope. It is noted that whether the distribution of the size of the tilted portion is approximated by the straight line (Y=kX) or by the quadratic curve (Y=$k_1 X^2$+$k_2 X$) can be optionally determined from each state of the distribution of the size of the tilted portion. However, it should be appreciated that if the distribution of the size of the tilted portion tends to show a profile like a quadratic function, the approximation with a proper quadratic curve can be selected for setting the correction amount more accurately.

Next, the mask pattern that is corrected for the tapered portion and tilted portion will be described.

Figure 18:
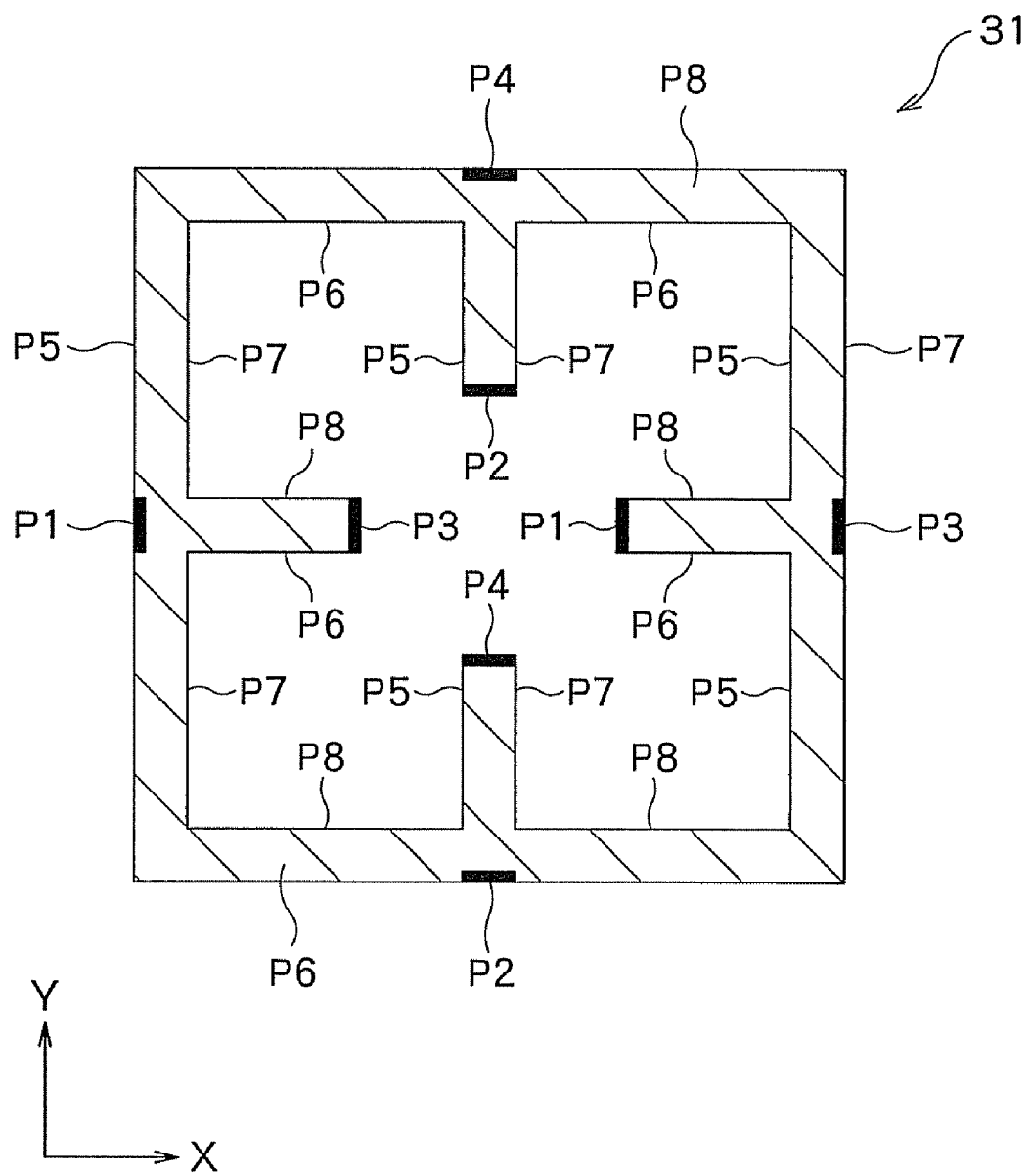
FIG. 18 is a view illustrating each amount of correction for the tapered portion and tilted portion, related to the mask pattern.

As described above, at the center $P_0(0, 0)$ of the SOI wafer 11' shown in FIG. 17(A), only the correction for the tapered portion is performed, while the correction for the tilted portion is not required. Meanwhile, at the point P(x, y) located at the distance r from the center of the SOI wafer 11', the correction for both of the tapered portion and tilted portion should be performed. Now, the correction for both of the tapered portion and tilted portion, related to each region or part of the mask pattern 31 at the point P(x, y), will be described in more detail with reference to FIG. 18. In the mask pattern 31 located at the point P(x, y), eight regions, respectively designated by P1 to P8, are first set as shown in FIG. 18, depending on difference in positions in the X-axial direction and Y-axial direction, i.e., depending on difference in regions respectively corrected by utilizing the 50% correction and 100% correction for the tilted portion. Then, the correction for the tapered portion and/or tilted portion is performed for each set region. Specifically, the regions P1 to P4 are respectively provided with the 100% correction for the tilted portion, while P5 to P8 are subjected to the 50% correction for the tilted portion. Namely, each amount ($h_1$ to $h_8$) of correction of the regions P1 to P8 can be expressed as follows.

P1  $h_1 = t - C_x = (Ar^2 + B)/2 - kx$

P2  $h_2 = t - C_y = (Ar^2 + B)/2 - ky$

P3  $h_3 = -t - C_x = -(Ar^2 + B)/2 - kx$

P4  $h_4 = -t - C_y = -(Ar^2 + B)/2 - ky$

P5  $h_5 = t - C_x/2 = (Ar^2 + B)/2 - kx/2$

P6  $h_6 = t - C_y/2 = (Ar^2 + B)/2 - ky/2$

P7  $h_7 = -t - C_x/2 = -(Ar^2 + B)/2 - kx/2$

P8  $h_8 = -t - C_y/2 = -(Ar^2 + B)/2 - ky/2$

It is noted that if each correction amount $h_1$ to $h_8$ of the regions P1 to P8 is a positive value, the correction will be performed in the positive direction in the X-axial direction or Y-axial direction, and that if each correction amount $h_1$ to $h_8$ is a negative value, the correction is performed in the negative direction in the X-axial direction or Y-axial direction.

It should be appreciated that the present invention is not limited to the above embodiment. For instance, while the mask pattern 31 has been formed on the silicon layer 14 (or base silicon) of the SOI wafer 11' in the above embodiment, a metal mask or the like having a desired opening may be provided, in place of the mask pattern 31, in the vicinity of the silicon layer 14 (or base silicon).

In addition, while the piezo-resistance-type acceleration sensor has been discussed by way of example in the above embodiment, this invention is also applicable to the capacitance-type acceleration sensor and/or angular velocity sensor.

Furthermore, while the SOI wafer has been discussed, as an object to be etched, in the method of this invention for correcting the mask pattern, this method can be applied to any other suitable object, such as a silicon wafer, a metallic substrate or the like, to which the dry-etching process can be provided.

INDUSTRIAL APPLICABILITY

The present invention can be applied to various fields, for which a high-precision dry-etching process is required, and also applied to various field, for which a significantly small-sized and highly reliable acceleration sensor and/or angular velocity sensor is required.

The invention claimed is:

1. A method for manufacturing an acceleration sensor or an angular velocity sensor, comprising:

dividing an SOI wafer having a three-layer structure composed of an active-layer silicon layer, a silicon-oxide layer and a base silicon layer, into multiple faces, and then providing a first frame, a plurality of beams respectively projecting inward from the first frame and a weight junction supported by the beams, in the active-layer silicon layer, for each divided face of the SOI wafer;

forming a second frame and a weight in the base silicon layer, the weight being positioned inside the second frame, in a non-contact manner to the second frame, and joined to and held by the weight junction via the silicon-oxide layer;

removing the silicon-oxide layer exposed to the outside; and joining a supporting substrate to the second frame of the base silicon layer, in a non-contact manner to the weight, wherein, in forming the second frame and weight in the base silicon layer, the second frame and weight are formed, respectively, by forming an opening, by dry-etching the base silicon layer, via a mask pattern having a corresponding opening, until the silicon-oxide layer is exposed, wherein the mask pattern has been corrected, in advance, to have a desired width of the opening thereof, and wherein the correction of the mask pattern comprises:

dry-etching at least a portion of the base silicon layer with a desired etching apparatus using a reference mask pattern which is not yet corrected, and then measuring a distribution of a size of expansion of a tapered portion formed in a surface of a remaining portion of the base silicon layer after being etched; and approximating the measured distribution by using a quadratic curve ($Y = AX^2 + B$), so as to determine A and B, and then setting an amount t of correction for the tapered portion, expressed by the following equation (1) and related to the width of the opening of the mask pattern in a position at a distance r from a center of the portion of the base silicon layer to be removed by etching, thereby performing the correction for the tapered portion, such that the width of the opening can be set narrower than a designed value thereof $t = (Ar^2 + B)/2$ (1).

2. The method for manufacturing the acceleration sensor and angular velocity sensor, according to claim 1, further comprising:

measuring distribution of the size of a tilted portion formed in the remaining portion of the base silicon layer after being etched; and (A) approximating the measured distribution by using a straight line ($Y = kX$), so as to determine k ($k > 0$), and then setting an amount $C_x$ of correction in the X-axial direction and an amount $C_y$ of correction in the Y-axial direction, respectively expressed by the following equations (2-1) and (2-2) and related to the width of the opening of the mask pattern in a position corresponding to a position vector r having coordinates (x, y) relative to the center of a portion of the base silicon layer to be removed by etching, thereby performing the correction for the tilted portion, based on the amounts $C_x$ and $C_y$ of correction:

$$C_x = kx \quad (2\text{-}1)$$

$$C_y = ky \quad (2\text{-}2), \text{ or}$$

(B) approximating the measured distribution by using a quadratic curve ($Y = k_1 X^2 + k_2 X$), so as to determine $k_1$, $k_2$ ($k_1 > 0$, $k_2 > 0$), and then setting the amount $C_x$ of correction in the X-axial direction and the amount $C_y$ of correction in the Y-axial direction, respectively expressed by the following equations (3-1) and (3-2) and related to the width of the opening of the mask pattern in a position corresponding to the position vector r having the coordinates (x, y) relative to the center of the portion of the base silicon layer to be removed by etching, thereby performing the correction for the tilted portion, based on the amounts $C_x$ and $C_y$ of correction.

$$C_x = k_1 (x^2 + y^2)^{1/2} \cdot x + k_2 \cdot x \quad (3\text{-}1)$$

$$C_y = k_1 (x^2 + y^2)^{1/2} \cdot y + k_2 \cdot y \quad (3\text{-}2)$$

3. The method for manufacturing the acceleration sensor and angular velocity sensor, according to claim 2, wherein the correction for the tilted portion, related to the width of the opening of the mask pattern, is performed, by setting the amount of correction for the tilted portion to be expressed by $C_x$ and $C_y$, in regions having influence on the length of the corresponding beam, while setting the amount of correction for the tilted portion to be expressed by $C_{x/2}$ and $C_{y/2}$ in the other regions.

* * * * *

UNITED STATES PATENT AND TRADEMARK OFFICE
CERTIFICATE OF CORRECTION

PATENT NO. : 8,241,923 B2  
APPLICATION NO. : 12/522786  
DATED : August 14, 2012  
INVENTOR(S) : Akio Morii Page 1 of 1

It is certified that error appears in the above-identified patent and that said Letters Patent is hereby corrected as shown below:

<u>Column 14, Line 14</u>

(claim 3), line 8: please change "$C_{x/2}$" to --$C_x/2$-- and "$C_{y/2}$" to --$C_y/2$--.

Signed and Sealed this  
Thirteenth Day of November, 2012

David J. Kappos  
*Director of the United States Patent and Trademark Office*